(12) United States Patent
Kosuge et al.

(10) Patent No.: US 11,252,349 B2
(45) Date of Patent: Feb. 15, 2022

(54) RADIATION DETECTION APPARATUS, CONTROL METHOD OF THE SAME, AND RADIATION IMAGING SYSTEM

(71) Applicant: CANON KABUSHIKI KAISHA, Tokyo (JP)

(72) Inventors: Asato Kosuge, Kawasaki (JP); Atsushi Iwashita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/986,841

(22) Filed: Aug. 6, 2020

(65) Prior Publication Data
US 2021/0067715 A1 Mar. 4, 2021

(30) Foreign Application Priority Data
Aug. 29, 2019 (JP) .............................. JP2019-157269

(51) Int. Cl.
*H04N 5/351* (2011.01)
*H04N 5/378* (2011.01)

(52) U.S. Cl.
CPC ............. *H04N 5/351* (2013.01); *H04N 5/378* (2013.01)

(58) Field of Classification Search
CPC ............................... H04N 5/351; H04N 5/378
See application file for complete search history.

(56) References Cited

U.S. PATENT DOCUMENTS

| | | | |
|---|---|---|---|
| 9,048,154 B2 | 6/2015 | Takenaka et al. | |
| 9,128,196 B2 | 9/2015 | Sato et al. | |
| 9,134,432 B2 | 9/2015 | Iwashita et al. | |
| 9,234,966 B2 | 1/2016 | Sugawara et al. | |
| 9,423,512 B2 | 8/2016 | Sato et al. | |
| 9,445,030 B2 | 9/2016 | Yagi et al. | |
| 9,462,989 B2 | 10/2016 | Takenaka et al. | |
| 9,468,414 B2 | 10/2016 | Ryu et al. | |
| 9,470,800 B2 | 10/2016 | Iwashita et al. | |

(Continued)

FOREIGN PATENT DOCUMENTS

JP 2014-023957 2/2014

OTHER PUBLICATIONS

U.S. Appl. No. 16/103,150, Atsushi Iwashita, filed Aug. 14, 2018.
(Continued)

*Primary Examiner* — Ahmed A Berhan
(74) *Attorney, Agent, or Firm* — Venable LLP

(57) ABSTRACT

A radiation detection apparatus includes a pixel array including pixels each including a conversion element and a switch element, an acquisition unit configured to acquire a first signal generated in the pixel array while at least one switch element of the pixels is in a conductive state, and a second signal generated in the pixel array while the switch elements are in a non-conductive state, an evaluation value determination unit configured to determine, based on the first signal, an evaluation value having a correlation with a radiation dose, a threshold value determination unit configured to determine a threshold value based not on the evaluation value but on the second signal, and a determination unit configured to determine, based on comparison between the evaluation value and the threshold value, whether the pixel array is being irradiated with radiation.

14 Claims, 11 Drawing Sheets

(56) References Cited

U.S. PATENT DOCUMENTS

| | | |
|---|---|---|
| 9,470,802 B2 | 10/2016 | Okada et al. |
| 9,541,653 B2 | 1/2017 | Iwashita et al. |
| 9,655,586 B2 | 5/2017 | Yagi et al. |
| 9,737,271 B2 | 8/2017 | Iwashita et al. |
| 9,812,474 B2 | 11/2017 | Yagi et al. |
| 9,971,046 B2 | 5/2018 | Ryu et al. |
| 9,980,685 B2 | 5/2018 | Iwashita et al. |
| 9,989,656 B2 | 6/2018 | Sato et al. |
| 10,009,990 B2 | 6/2018 | Takenaka et al. |
| 10,197,684 B2 | 2/2019 | Terui et al. |
| 10,274,612 B2 | 4/2019 | Ishii et al. |
| 10,441,238 B2 | 10/2019 | Terui et al. |
| 10,492,748 B2 | 12/2019 | Nonaka et al. |
| 10,506,183 B2 | 12/2019 | Kuwabara et al. |
| 10,754,046 B2 | 8/2020 | Kosuge et al. |
| 10,779,777 B2 | 9/2020 | Terui et al. |
| 10,782,251 B2 | 9/2020 | Sato et al. |
| 2014/0239186 A1 | 8/2014 | Sato et al. |
| 2014/0361189 A1 | 12/2014 | Kameshima et al. |
| 2016/0270755 A1 | 9/2016 | Takenaka et al. |
| 2016/0370225 A1* | 12/2016 | Iwashita .................. H04N 5/32 |
| 2018/0095181 A1* | 4/2018 | Kosuge .................. H04N 5/32 |
| 2018/0128755 A1 | 5/2018 | Iwashita et al. |
| 2019/0179036 A1 | 6/2019 | Takenaka et al. |
| 2019/0320993 A1 | 10/2019 | Noda et al. |
| 2019/0349541 A1 | 11/2019 | Iwashita et al. |
| 2020/0124749 A1 | 4/2020 | Takenaka et al. |
| 2020/0150059 A1 | 5/2020 | Torii et al. |
| 2020/0150286 A1 | 5/2020 | Terui et al. |
| 2020/0155097 A1 | 5/2020 | Torii et al. |
| 2020/0211238 A1 | 7/2020 | Iwashita et al. |
| 2020/0245441 A1 | 7/2020 | Tsukuda et al. |

OTHER PUBLICATIONS

U.S. Appl. No. 17/080,959, Kosuke Terui, filed Oct. 27, 2020.
U.S. Appl. No. 17/091,008, Takeshi Noda, filed Nov. 6, 2020.

* cited by examiner

RADIATION DETECTION APPARATUS, CONTROL METHOD OF THE SAME, AND RADIATION IMAGING SYSTEM

BACKGROUND OF THE INVENTION

Field of the Invention

The present invention relates to a radiation detection apparatus, a control method of the same, and a radiation imaging system.

Description of the Related Art

There is known a radiation imaging apparatus that electrically captures an optical image formed by radiation. The radiation imaging apparatus performs a radiation imaging operation in synchronization with the start of radiation irradiation. As the synchronization method, there are known a method of transmitting a synchronization signal from a control apparatus of a radiation source to the radiation imaging apparatus and a method in which the radiation imaging apparatus detects radiation applied to itself. Japanese Patent Laid-Open No. 2014-23957 proposes a radiation imaging apparatus that detects the start of radiation irradiation based on an electrical signal originated from electric charges generated in a sensor unit.

SUMMARY OF THE INVENTION

A method is conceivable in which the evaluation value of the radiation dose is compared with a threshold value to determine whether radiation is being applied. The evaluation value of the radiation dose changes not only due to irradiation of radiation but also due to noise. Therefore, if the noise included in the evaluation value of the radiation dose is large, the evaluation value exceeds the threshold value even though the radiation is not being applied, resulting in false detection. One aspect of the present disclosure provides a technique for reducing false detection of radiation irradiation.

An embodiment of the present disclosure provides a radiation detection apparatus comprising: a pixel array including a plurality of pixels, each of the plurality of pixels including a conversion element and a switch element; an acquisition unit configured to acquire a first signal generated in the pixel array while at least one of the switch elements of the plurality of pixels is in a conductive state, and a second signal generated in the pixel array while the switch elements of the plurality of pixels are in a non-conductive state; an evaluation value determination unit configured to determine, based on the first signal, an evaluation value having a correlation with a radiation dose; a threshold value determination unit configured to determine a threshold value based not on the evaluation value but on the second signal; and a determination unit configured to determine, based on comparison between the evaluation value and the threshold value, whether the pixel array is being irradiated with radiation.

DESCRIPTION OF THE EMBODIMENTS

Figure 1:
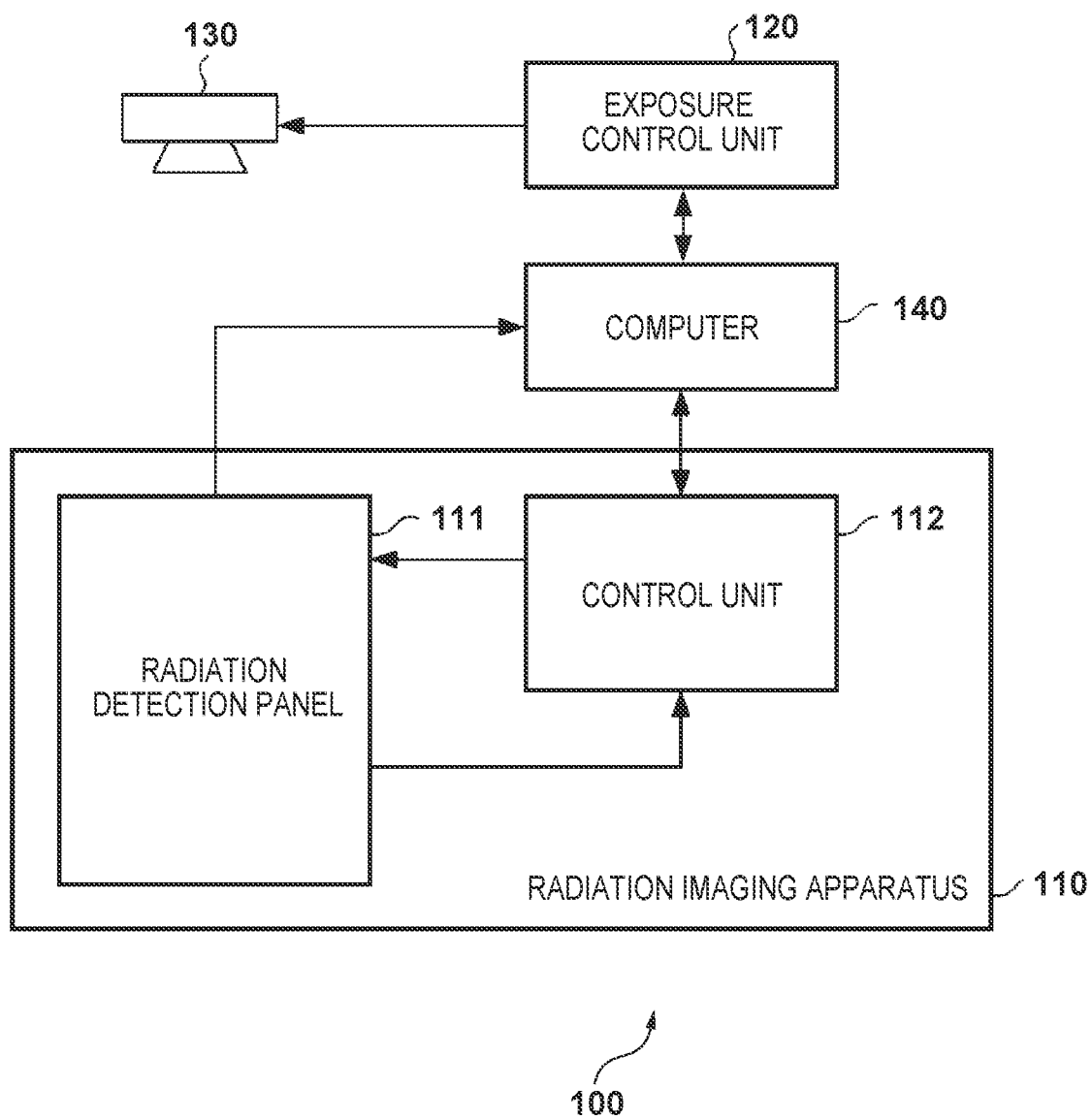
FIG. 1 is a block diagram showing the configuration of a radiation imaging system according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

With reference to FIG. 1, a configuration example of a radiation imaging system 100 according to the first embodiment will be described. The radiation imaging system 100 is configured to electrically capture an optical image formed by radiation and obtain an electrical radiation image (that is, radiation image data). Typically, radiation can be X-rays, but it may be $\alpha$-rays, $\beta$-rays, $\gamma$-rays, or the like. The radiation imaging system 100 can include, for example, a radiation imaging apparatus 110, an exposure control unit 120, a radiation source 130, and a computer 140. The radiation source 130 starts emission of radiation in accordance with an exposure command (emission command) from the exposure control unit 120. The radiation emitted from the radiation source 130 passes through a subject (not shown) and is applied to the radiation imaging apparatus 110.

The radiation imaging apparatus 110 includes a radiation detection panel 111 and a control unit 112 that controls the radiation detection panel 111. The radiation imaging apparatus 110 detects radiation, so that it may be referred to as a radiation detection apparatus. The control unit 112 can be formed from, for example, a PLD (the abbreviation of a Programmable Logic Device) such as an FPGA (the abbreviation of a Field Programmable Gate Array), an ASIC (the abbreviation of an Application Specific Integrated Circuit), a general-purpose processor that executes a program stored in a memory, or a combination of all or some of these components. The control unit 112 may include analog circuits such as a sample hold circuit and an operational amplifier.

In addition to control of the radiation detection panel 111, the control unit 112 processes a signal output from the radiation detection panel 111. The control unit 112 determines the start of radiation irradiation based on a detection signal output from the radiation detection panel 111, and causes the radiation detection panel 111 to start a radiation imaging operation.

Figure 2:
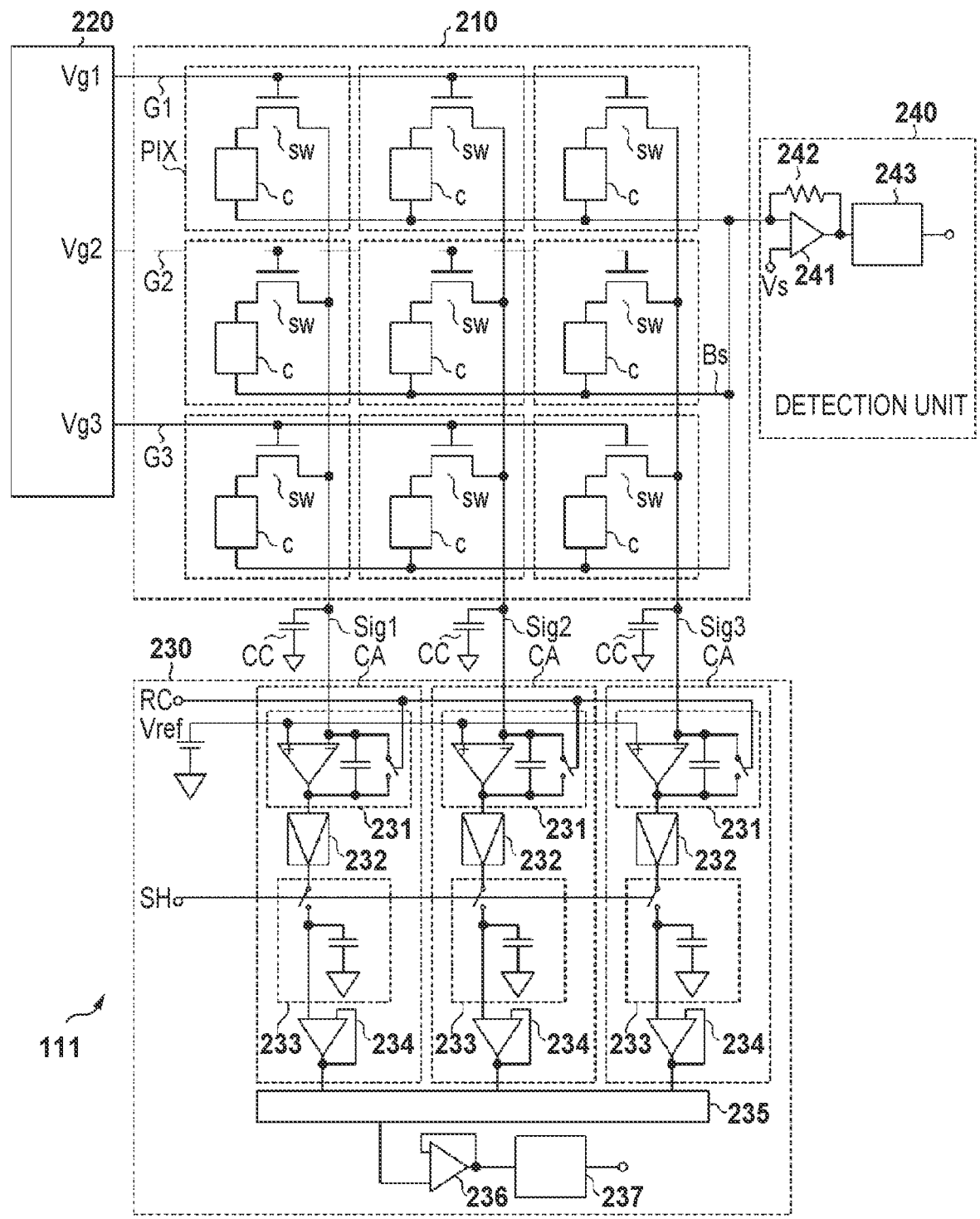
FIG. 2 is a view showing the arrangement of a radiation detection panel according to the embodiment of the present invention.

FIG. 2 shows an arrangement example of the radiation detection panel 111. The radiation detection panel 111 includes a pixel array 210. The pixel array 210 includes a plurality of pixels PIX that detect radiation and a plurality of column signal lines Sig1 to Sig3 (to be collectively referred to as SIG). The plurality of pixels PIX are arranged so as to form a plurality of pixel rows and a plurality of pixel columns. The pixel row is a set of pixels PIX arranged in the horizontal direction in FIG. 2. The pixel column is a set of pixels PIX arranged in the vertical direction in FIG. 2. For simplification of description, the pixel array 210 is formed by the pixels PIX in 3 rows×3 columns in FIG. 2, but in practice, more pixels PIX can be arrayed. In one example, the radiation detection panel 111 can have a size of 17 inches and include the pixels PIX in about 3,000 rows×3,000 columns.

The radiation detection panel 111 also includes a drive circuit (row selection circuit) 220 that drives the pixel array 210, a readout unit 230 that detects signals appearing on the plurality of column signal lines Sig of the pixel array 210, and a detection unit 240 that detects irradiation of radiation. In this example, the detection unit 240 also serves as a bias circuit that applies a bias potential Vs to all or some of the plurality of pixels PIX forming the pixel array 210 via bias lines Bs (conductive lines).

The detection unit 240 also serving as the bias circuit can include a differential amplifier 241 and a feedback resistance 242 connected between the first input terminal of the differential amplifier 241 and the output terminal of the differential amplifier 241. The second input terminal of the differential amplifier 241 is supplied with the bias potential Vs. Due to the imaginary short circuit, the first input terminal and the second input terminal of the differential amplifier 241 have the same potential. Accordingly, the potential of the bias line Bs is driven to the bias potential Vs by the differential amplifier 241. A potential according to the current flowing through the bias line Bs, that is, the electrical signal appearing on the bias line Bs is output to the output terminal of the differential amplifier 241. The current flowing through the bias line Bs is a signal having sensitivity to irradiation of radiation. In other words, the current flowing through the bias line Bs has a correlation with the radiation dose.

When the radiation detection panel 111 (more specifically, the pixel array 210 thereof) is irradiated with radiation, a current according to the radiation flows through the bias line Bs. Therefore, an electrical signal having a correlation with the irradiation amount of radiation applied to the pixel array 210 appears at the output terminal of the differential amplifier 241. The detection unit 240 can include an A/D converter 243 that A/D-converts a signal output to the output terminal of the differential amplifier 241. In the following description, a signal output from the A/D converter 243 of the detection unit 240 and supplied to the control unit 112 is referred to as a detection signal, but a signal output to the output terminal of the differential amplifier 241 can also be understood as the detection signal. In addition, a circuit such as an amplification circuit and/or a filter may be arranged between the differential amplifier 241 and the A/D converter 243. The A/D converter 243 may be provided in the control unit 112.

The detection unit 240 detects irradiation of radiation to the pixel array 210 by detecting the current flowing through the bias line Bs, but this is merely an example. Irradiation of radiation to the pixel array 210 may be detected by detecting the potential of the column signal line Sig or the current flowing through the column signal line Sig. Alternatively, irradiation of radiation to the pixel array 210 may be detected by reading out signals from some of the plurality of pixels PIX by the readout unit 230. Alternatively, irradiation of radiation to the pixel array 210 may be detected by a dedicated radiation detection sensor arranged inside or outside the pixel array 210.

Each pixel PIX includes a conversion element C that detects radiation and a switch element SW that connects the conversion element C and the column signal line Sig (the column signal line Sig corresponding to the conversion element C among the plurality of column signal lines Sig). The conversion element C outputs a signal corresponding to the amount of the radiation entering the conversion element C to the column signal line Sig. The conversion element C can include, for example, a MIS photodiode arranged on an insulating substrate such as a glass substrate or a plastic substrate and mainly formed of amorphous silicon. Alternatively, the conversion element C can include a PIN photodiode. The conversion element C may be configured as a direct type that directly converts radiation into an electrical signal, or may be configured as an indirect type that converts radiation into light and then detects the light. In the indirect type, a scintillator can be shared by the plurality of pixels PIX.

The switch element SW can be formed by, for example, a transistor such as a thin film transistor (TFT) including a control terminal (gate) and two main terminals (source and drain). The conversion element C includes two main electrodes. One of the main electrodes of the conversion element C is connected to one of the two main terminals of the switch element SW, and the other main electrode of the conversion element C is connected to the bias line Bs. The bias potential Vs is supplied to the conversion element C via the bias line Bs. The control terminal of the switch element SW of each pixel PIX in the first row is connected to a gate line G1, the control terminal of the switch element SW of each pixel PIX in the second row is connected to a gate line G2, and the control terminal of the switch element SW of each pixel PIX in the third row is connected to a gate line G3. The drive circuit 220 supplies gate signals Vg1, Vg2, Vg3, . . . to the gate lines G1, G2, G3, . . . , respectively.

One of the main terminals of the switch element SW of each pixel PIX in the first column is connected to the column signal line Sig1 in the first column. One of the main terminals of the switch element SW of each pixel PIX in the second column is connected to the column signal line Sig2 in the second column. One of the main terminals of the switch element SW of each pixel PIX in the third column is connected to the column signal line Sig3 in the third column. Each column signal line Sig (Sig1, Sig2, Sig3, . . . ) has a capacitance CC.

The readout unit 230 includes a plurality of column amplification units CA such that one column amplification unit CA corresponds to one column signal line Sig. Each column amplification unit CA can include, for example, an integrating amplifier 231, a variable amplifier 232, a sample hold circuit 233, and a buffer circuit 234. The integrating amplifier 231 amplifies the signal appearing on the corresponding column signal line Sig. The integrating amplifier 231 can include, for example, an operational amplifier, and an integrating capacitor and a reset switch connected in parallel between the inverting input terminal and the output terminal of the operational amplifier. A reference potential Vref is supplied to the non-inverting input terminal of the operational amplifier. The reset switch is turned on when a reset signal RC driven by the control unit 112 is activated, and this causes reset of the integrating capacitor and reset of the potential of the column signal line Sig to the reference potential Vref.

The variable amplifier 232 performs amplification with the amplification factor set by the integrating amplifier 231. The sample hold circuit 233 samples and holds the signal from the variable amplifier 232 when a sample hold signal SH driven by the control unit 112 is activated. The sample hold circuit 233 can be formed by, for example, a sampling switch and a sampling capacitor. The buffer circuit 234 buffers (impedance-converts) and outputs the signal from the sample hold circuit 233. The sampling switch can be controlled by a sampling pulse supplied from the control unit 112.

The readout unit 230 also includes a multiplexer 235 that selects and outputs, in a predetermined order, signals from the plurality of column amplification units CA provided so as to respectively correspond to the plurality of column signal lines Sig. The multiplexer 235 includes, for example, a shift register. The shift register performs a shift operation in accordance with a clock signal supplied from the control unit 112, so that one of the signals from the plurality of column amplification units CA is selected by the shift register. The detection unit 240 can also include a buffer 236 that buffers (impedance-converts) a signal output from the multiplexer 235, and an A/D converter 237 that converts an analog signal, which is a signal output from the buffer 236, into a digital signal. An output of the A/D converter 237, that is, radiation image data is supplied to the computer 140.

The operation of the radiation imaging apparatus 110 includes an initialization operation, an accumulation operation, and a readout operation. The initialization operation is an operation of initializing the plurality of pixels PIX of the pixel array 210 for each row. The accumulation operation is an operation of accumulating electric charges generated in each pixel PIX of the pixel array 210 due to irradiation of radiation. The readout operation is an operation of reading out a signal according to the electric charges accumulated in each pixel PIX of the pixel array 210 due to irradiation of radiation to the pixel array 210 from the pixel array 210 and outputting the readout signal as an image (image signal).

Transition from the initialization operation to the accumulation operation is executed when the control unit 112 determines, based on the detection signal output from the detection unit 240, that irradiation of radiation to the radiation imaging apparatus 110 has started. Transition from the accumulation operation to the readout operation is executed when, for example, a predetermined time has elapsed since the start of the accumulation operation.

Figure 3:
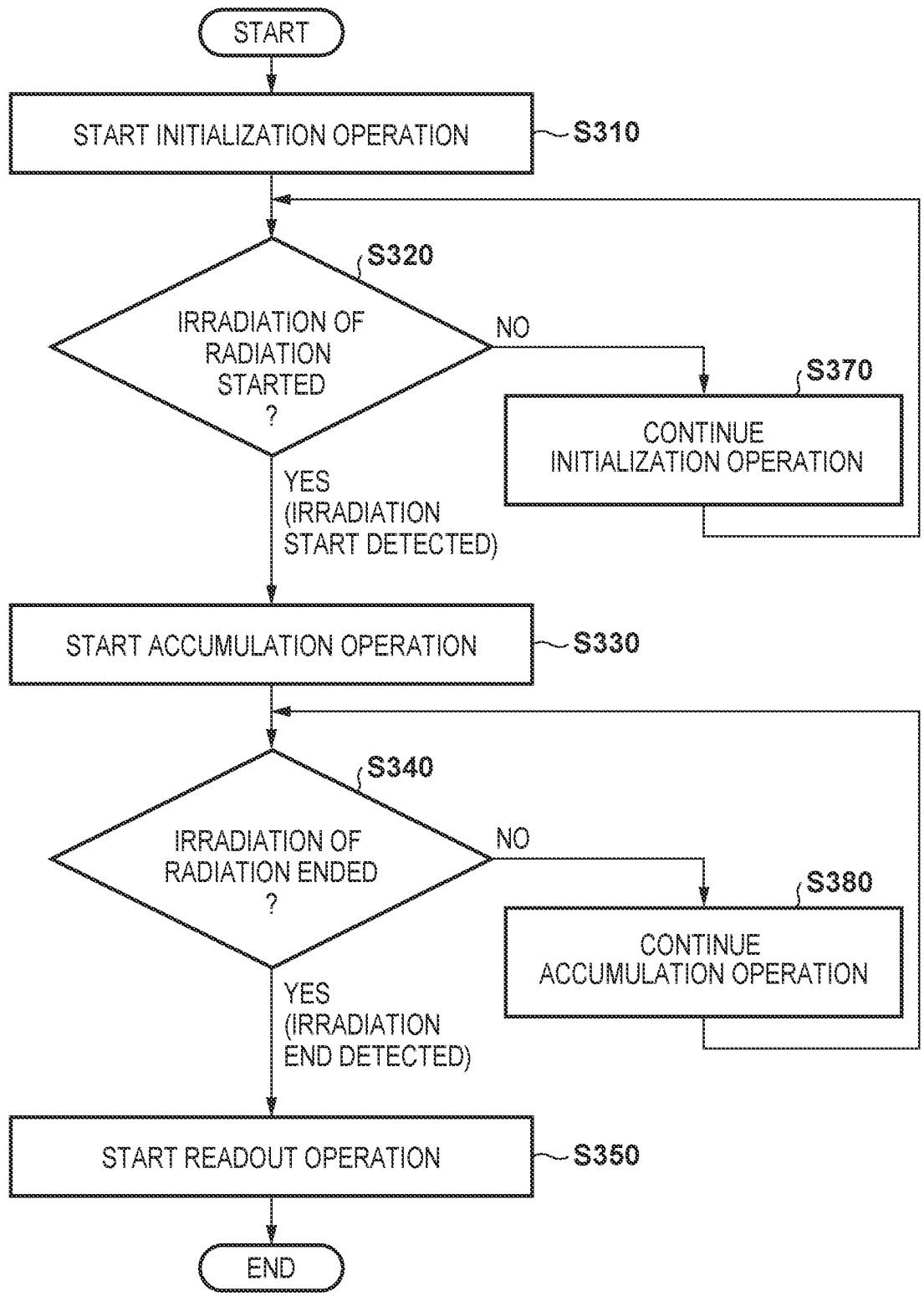
FIG. 3 is a flowchart for explaining an operation of a radiation imaging apparatus according to the embodiment of the present invention.
Figure 4:
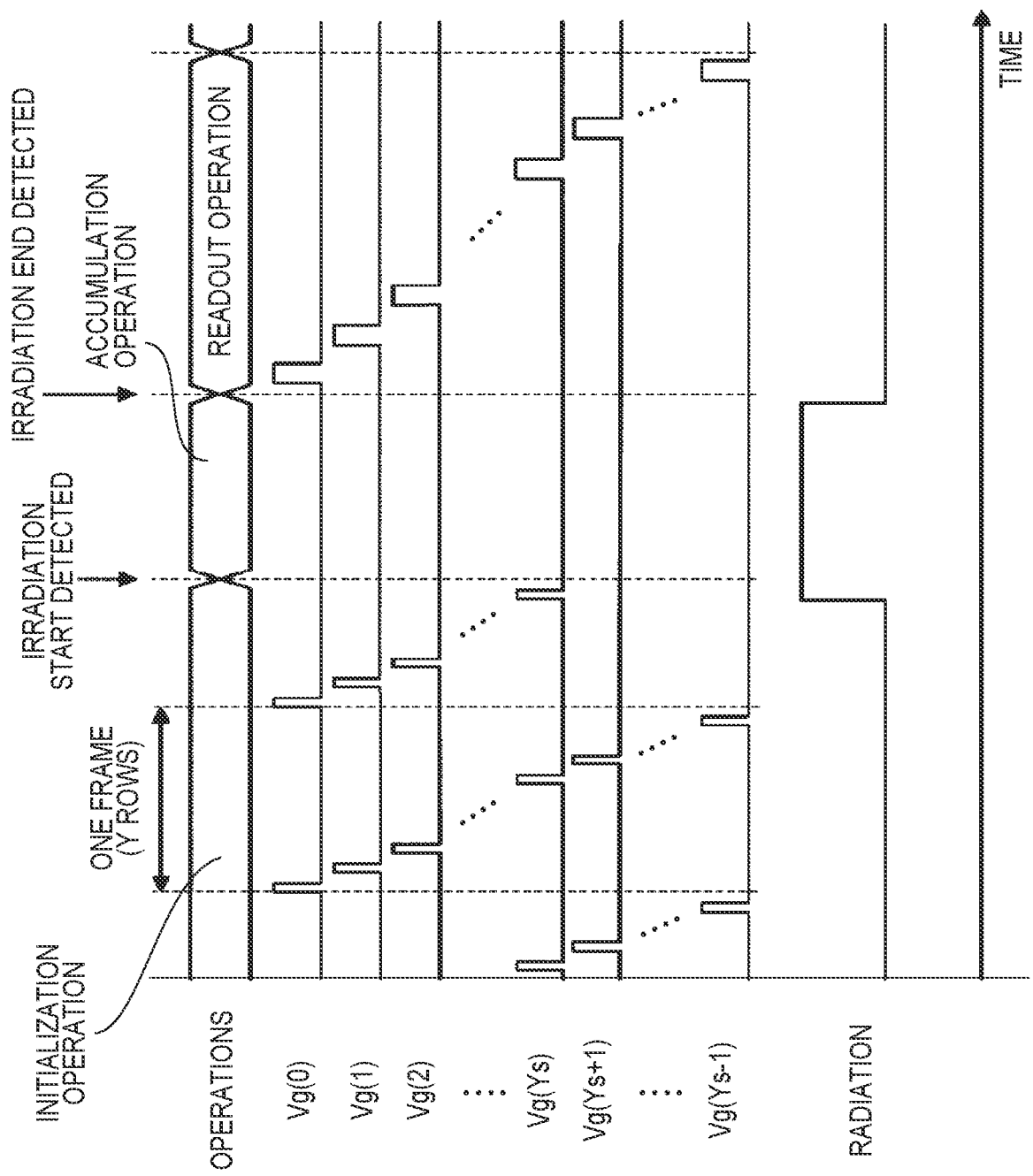
FIG. 4 is a timing chart for explaining the operation of the radiation imaging apparatus according to the embodiment of the present invention.

With reference to FIGS. 3 and 4, an example of the operation of determining whether the radiation imaging apparatus 110 is being irradiated with radiation will be described. In step S310, the control unit 112 starts the initialization operation. In the initialization operation, the control unit 112 repeats an operation of sequentially setting the gate lines G (G1, G2, G3, . . . ) from the first row to the last row at an active level and setting the reset signal RC at an active level. Here, when the reset signal RC is set at the active level, the integrating amplifier 231 is set in a voltage follower state, and the reference potential Vref is supplied to the column signal line Sig. In this state, the switch element SW in the row in which the gate line G has been set at the active level is set in a conductive state, and the electric charges accumulated in the conversion element C are initialized. In FIG. 4, Vg(0), Vg(1), Vg(2), . . . , Vg(Ys), Vg(Ys+1), . . . , Vg(Y−1) indicate the drive signals supplied to the gate lines G from the first row to the last row of the pixel array 210, respectively. In this embodiment, the drive circuit 220 repeatedly performs the initialization operation of setting the switch elements SW in any pixel row of the plurality of pixel rows in the conductive state and then setting the switch elements SW of the plurality of pixels PIX in a non-conductive state. The operation of setting the switch elements SW in one pixel row in the conductive state and then setting the switch elements SW of the plurality of pixels PIX in the non-conductive state is referred to as one initialization operation. The drive circuit 220 performs the initialization operation Y times from Vg(0) to Vg(Y−1), and then repeats the initialization operation from Vg(0).

In the period of the initialization operation, the detection unit 240 outputs a detection signal having a correlation with the irradiation amount of radiation applied to the pixel array 210. During the initialization operation, in step S320, the control unit 112 determines whether irradiation of radiation has started. More specifically, the control unit 112 determines, based on the detection signal output from the detection unit 240, whether irradiation of radiation to the pixel array 210 has started.

The control unit 112 continues the initialization operation (step S370) until it is determined that irradiation of radiation to the pixel array 210 has started. If it is determined that irradiation of radiation to the pixel array 210 has started (YES in step S320), the control unit 112 starts the accumulation operation in step S330. That is, if the start of radiation irradiation is detected (this is indicated as "irradiation start detection" in FIG. 4), the control unit 112 transitions from the initialization operation to the accumulation operation. Processing in step S320 will be described later.

During the accumulation operation, in step S340, the control unit 112 determines the completion of the irradiation of radiation. The method of determining the completion of the irradiation of radiation is not particularly limited, but it is possible to determine that the irradiation of radiation is completed when, for example, a predetermined time has elapsed since the start of the accumulation operation. Alternatively, the control unit 112 can determine that the irradiation of radiation to the pixel array 210 is completed based on at least one of the instantaneous value, the integrated value, and/or the differential value of the detection signal output from the detection unit 240.

The control unit 112 continues the accumulation operation (step S380) until it is determined that the irradiation of radiation to the pixel array 210 is completed. If it is determined that the irradiation of radiation to the pixel array 210 is completed (YES in step S340), the control unit 112 starts the readout operation in step S350. That is, if it is determined that the irradiation of radiation is completed (this is indicated as "irradiation completion detection" in FIG. 4), the control unit 112 transitions from the accumulation operation to the readout operation. In the readout operation, signals are sequentially read out from the pixels in the top row to the pixels in the bottom row of the pixel array 210.

Figure 5:
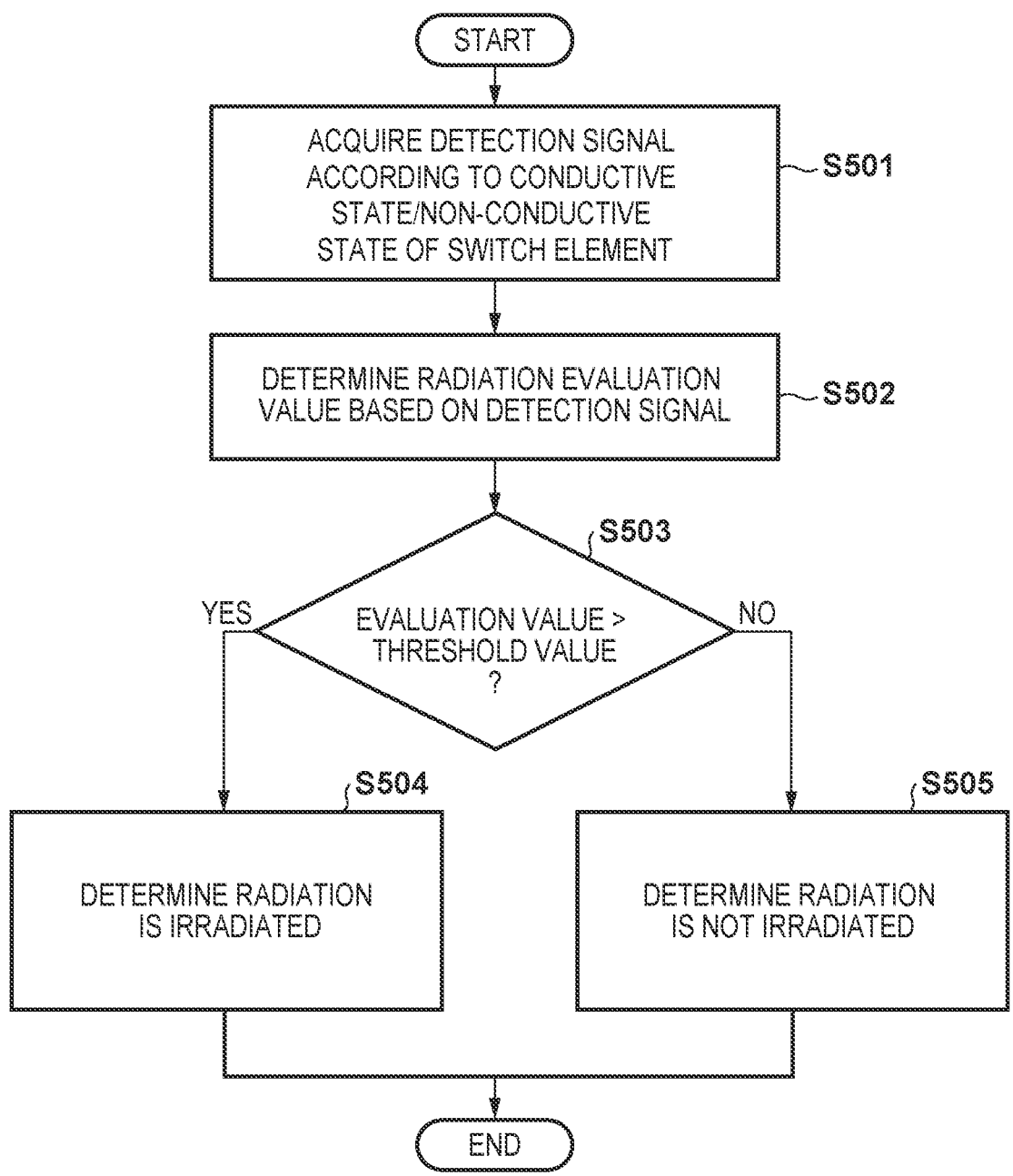
FIG. 5 is a flowchart for explaining a radiation detection operation according to the embodiment of the present invention.
Figure 6:
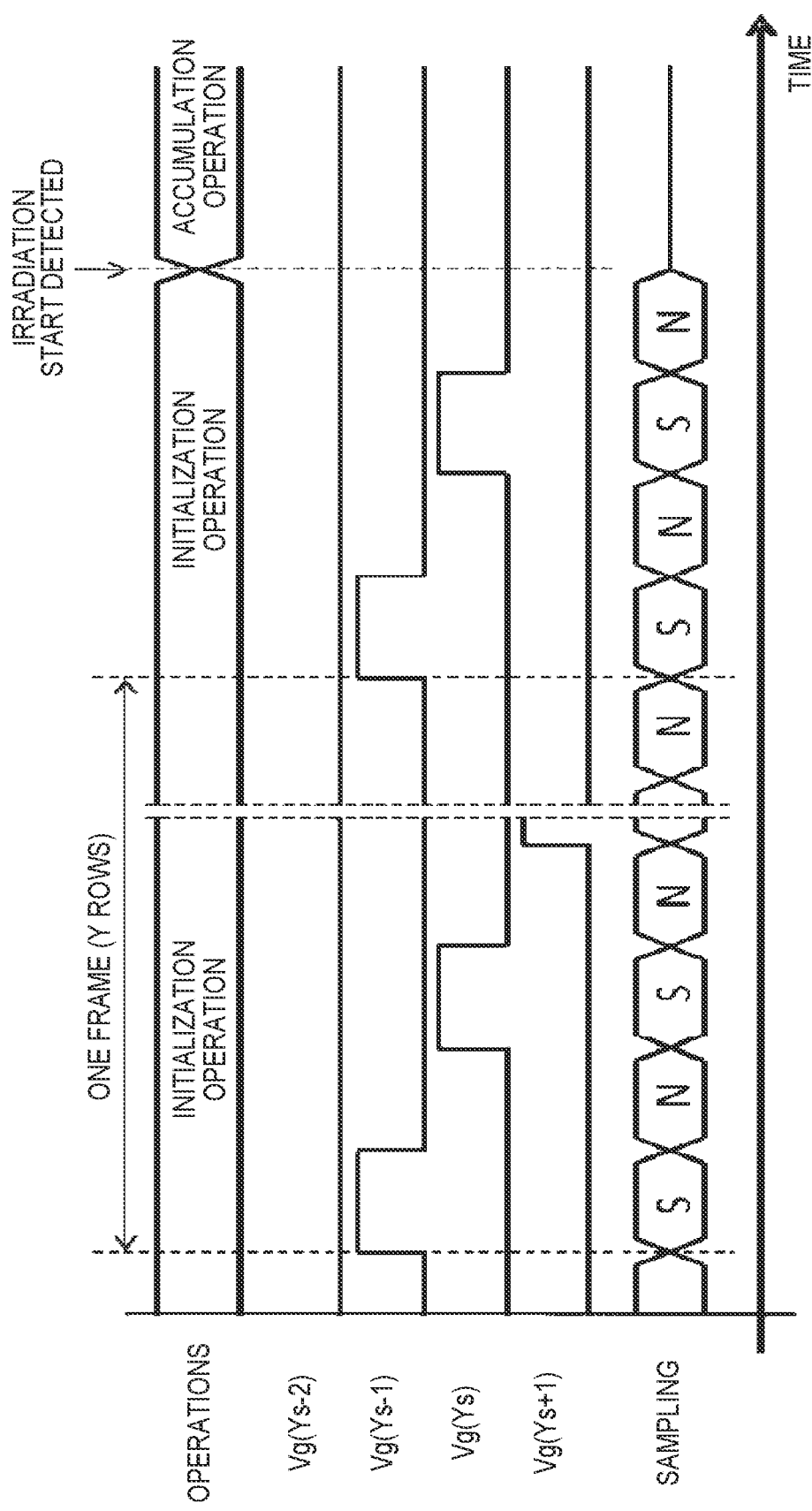
FIG. 6 is a timing chart for explaining the radiation detection operation according to the embodiment of the present invention.

With reference to FIGS. 5 and 6, the details of step S320 in FIG. 3 will be described. The operation illustrated in FIG. 5 is repeatedly performed while waiting for irradiation of radiation to the pixel array 210. In FIG. 6, Vg(Ys−2), Vg(Ys−1), Vg(Ys), and Vg(Ys+1) indicate the drive signals supplied to the gate lines G of the (Ys−2)th row to the (Ys+1)th row of the pixel array 210, respectively.

In step S501, the control unit 112 acquires the detection signal while waiting for the start of radiation irradiation. As has been described above, this detection signal is a signal generated in the pixel array 210 while the initialization operation is being performed. For example, the detection signal is a signal based on the current flowing through the bias line Bs while the initialization operation is being performed.

As shown in FIG. 6, during the repetition of the initialization operation, a period in which the switch elements SW in any pixel row are in the conductive state and a period in which the switch elements SW in all the pixel rows are in the non-conductive state occur alternately. While any of the switch elements SW is in the conductive state, a current proportional to the amount of electric charges accumulated in the conversion element C connected to this switch element SW flows through the bias line Bs. The detection signal based on this current is referred to as an S signal. Particularly, the S signal generated in the yth initialization operation from the start of processing is S [y]. Further, the detection signal based on the current flowing through the bias line Bs while the switch elements SW are in the non-conductive state is referred to as an N signal. Particularly, assume that the N signal generated in the yth initialization operation from the start of processing is N[y].

In step S502, the control unit 112 determines the evaluation value of the radiation dose based on the S signal and the N signal. In this operation, the control unit 112 functions as an evaluation value determination unit. For example, the control unit 112 determines the evaluation value by performing, on the S signal and the N signal, at least any of addition processing, CDS (Correlated Double Sampling) processing, and frame correction to be described below.

The addition processing will be described. The control unit 112 may acquire (for example, sample) a plurality of S signals and a plurality of N signals in one initialization operation. The control unit 112 sets a value obtained by adding or averaging some or all of the plurality of S signals as one S signal according to the one initialization operation. Similarly, the control unit 112 sets a value obtained by adding or averaging some or all of the plurality of N signals as one N signal according to the one initialization operation. When no addition processing is performed, that is, when one S signal and one N signal are acquired in one initialization operation, the control unit 112 uses these S signal and N signal in subsequent processing.

The CDS processing will be described. The control unit 112 may reduce noise included in the S signal by subtracting the N signal from the S signal. For example, the control unit 112 acquires an evaluation value X[y] according to the yth initialization operation in accordance with following equation (1).

$$X[y]=S[y]-N[y] \tag{1}$$

In this equation, the difference between the S signal and the N signal acquired in the same one initialization operation is set as the evaluation value X[y] of this initialization operation. Further, as shown in following equation (2), the control unit 112 may correct one S signal using the N signals acquired in the initialization operations for two different pixel rows.

$$X[y]=S[y]-\{N[y]+N[y-1]\}/2 \tag{2}$$

Furthermore, the control unit 112 may correct one S signal using the N signals obtained for two or more pixel rows, which are not adjacent to each other, in the initialization operation. When no CDS processing is performed, the control unit 112 may determine the evaluation value of the radiation dose based not on the N signal but on the S signal.

The frame correction will be described. The size of switching noise included in each of the S signal and the N signal can be different for each pixel row. On the other hand, it is known that the reproducibility of the size of switching noise is high in the same pixel row. Therefore, the control unit 112 reduces the switching noise by subtracting, from the S signal and the N signal obtained in one given initialization operation, the S signal and the N signal obtained from the initialization operation performed on the same row but at different time. Such correction is referred to as frame correction.

More specifically, the control unit 112 determines the evaluation value X[y] in accordance with the following equation (3). In the following equation (3), the CDS is performed together with the frame correction.

$$X[y]=[S[y]-\{N[y]+N[y-1]\}/2]-[S[y-Y]-\{N[y-Y]+N[y-1-Y]\}/2] \tag{3}$$

In this equation, the currently obtained S signal and N signal are corrected using the S signal and the N signal obtained for the same pixel row in the immediately preceding frame (in the initialization operation Y times before). Instead of or in addition to the S signal and the N signal in the immediately preceding frame, the S signal and the N signal acquired for the same pixel row at another time may be used.

In step S503, the control unit 112 determines whether the evaluation value determined in step S502 is larger than a threshold value. If the evaluation value is larger than the threshold value (YES in step S503), the control unit 112 advances the process to step S504; otherwise, the process advances to step S505. In step S504, the control unit 112 determines that the pixel array 210 is being irradiated with radiation. In this case, as illustrated in FIG. 3, the process advances to step S330. In step S505, the control unit 112 determines that the pixel array 210 is not being irradiated with radiation. As illustrated in FIG. 3, the process advances to step S370, and the operation illustrated in FIG. 5 is then repeated.

Figure 7:
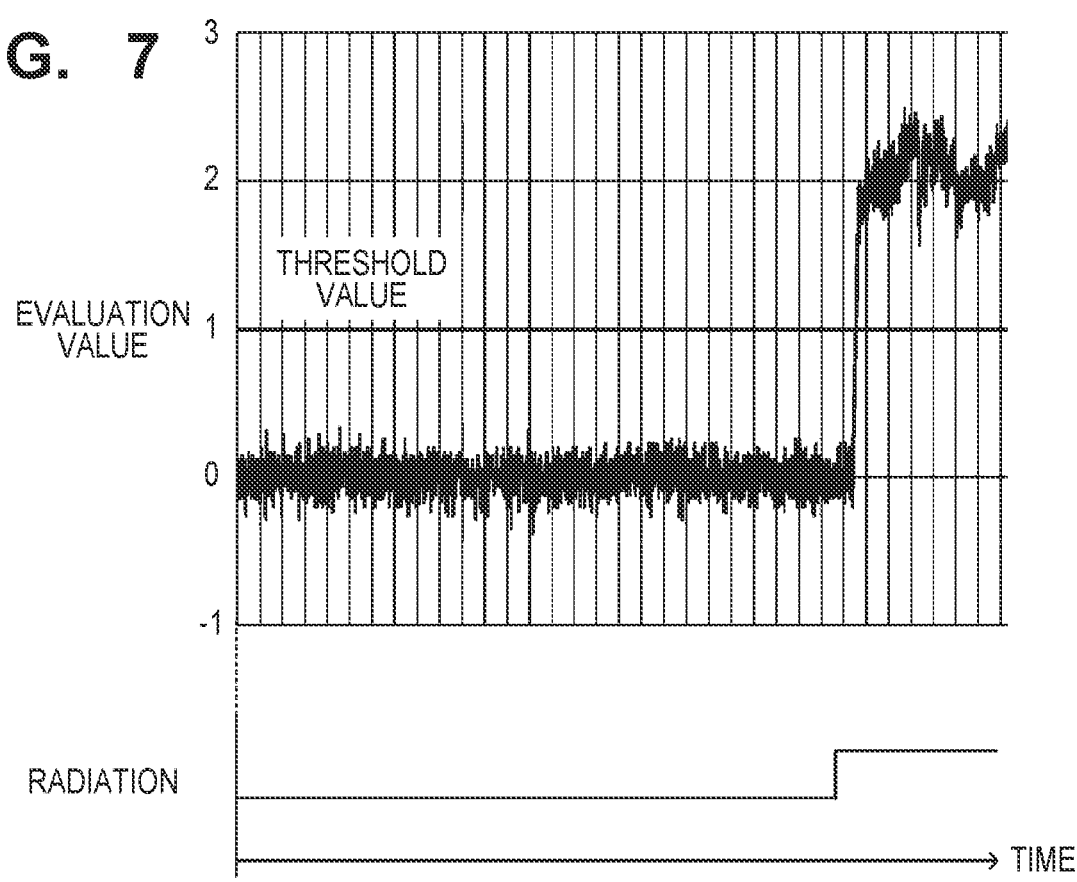
FIG. 7 shows graphs for explaining detection of radiation irradiation in a comparative example.
Figure 8:
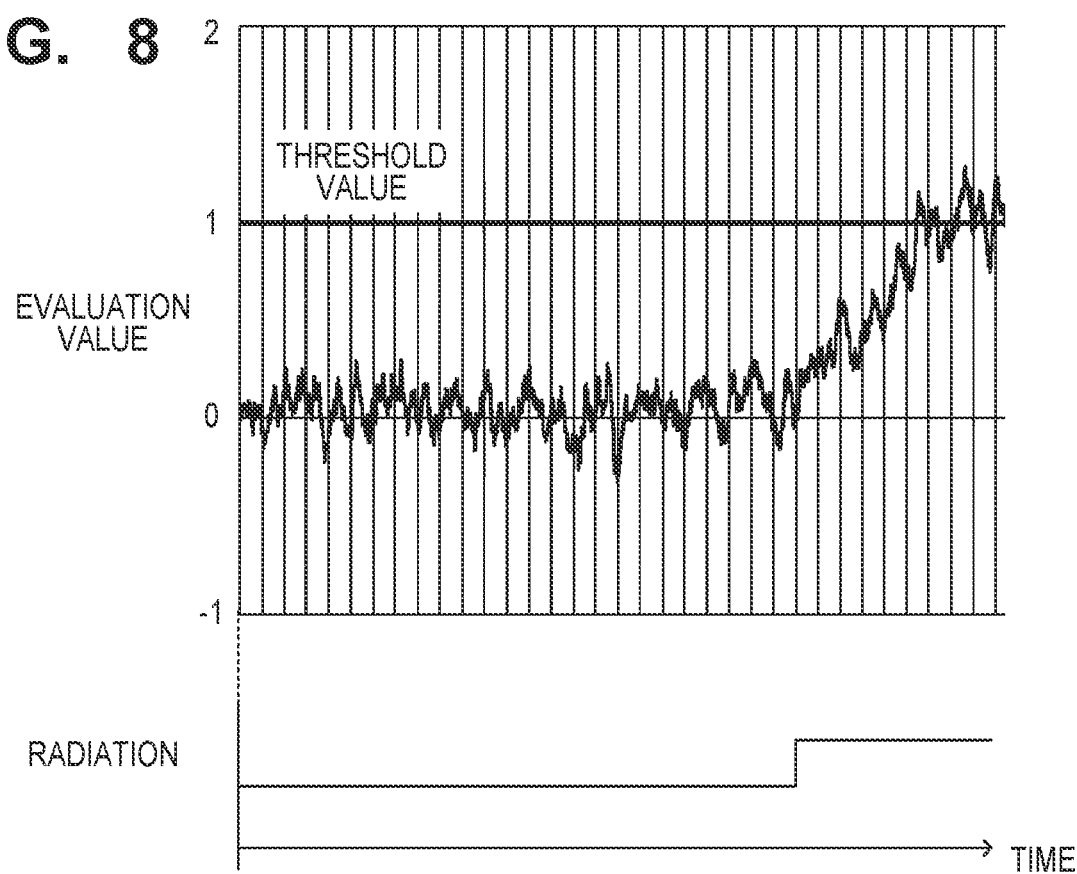
FIG. 8 shows graphs for explaining detection of radiation irradiation in the comparative example.

With reference to FIGS. 7 and 8, the operation in step S503 in a case in which the threshold value is a constant value will be described. The upper graph in each of FIGS. 7 and 8 shows the fluctuation of the evaluation value of the radiation dose determined in step S502. The lower graph in FIG. 7 shows the fluctuation of the irradiation amount of radiation. The lower graph in FIG. 8 shows the fluctuation of exogenous noise. In the graphs shown in FIG. 7, it is assumed that no exogenous noise is generated. In the graphs shown in FIG. 8, it is assumed that no radiation irradiation is performed.

As shown in FIGS. 7 and 8, the evaluation value of the radiation dose is affected by the current flowing through the bias line Bs due to electromagnetic waves generated by the radiation imaging apparatus 110 itself, internal noise of the detection unit 240, and the like. The influence of this current can be called system noise. In order to avoid false detection caused by system noise, the threshold value in step S503 is set to $\mu+3\sigma$ or more, where $\mu$ is an average value of evaluation values obtained when no radiation irradiation is performed and $\sigma$ is a standard deviation of the system noise. In FIGS. 7 and 8, the evaluation value graphs are normalized such that the average value $\mu$ becomes 0 and the threshold value becomes 1. By using such a threshold value, it is possible to avoid false detection due to system noise. On the other hand, as shown in FIG. 7, when radiation is applied, the evaluation value increases accordingly, and as a result, the evaluation value exceeds the threshold value. Therefore, the control unit 112 can correctly detect that the radiation is being applied.

FIG. 8 describes a case in which the evaluation value is affected by exogenous noise. The exogenous noise is noise generated in the evaluation value in accordance with an event external to the radiation imaging apparatus 110. Examples of the event that generates exogenous noise are as follows.

- Approach of an equipment that generates electromagnetic waves (for example, a cathode ray tube (CRT) or the like)
- Power on/off of an equipment (for example, the radiation source)
- Driving of a motor (for example, a motor for an electric drill for surgery or the rotating anode of the radiation source)
- Strong impact (for example, collision or the like)

For example, in some radiation sources, when a switch is pressed, the anode in the radiation tube starts to rotate in response to the press of the switch, and the electromagnetic waves generated at this time generate exogenous noise.

As shown in FIG. 8, if the evaluation value increases due to the influence of exogenous noise, the evaluation value may exceed the threshold value. In this case, the control unit 112 determines that the radiation is being applied even though radiation irradiation has not started. That is, false detection occurs. When such false detection occurs, the control unit 112 transitions to the accumulation operation (step S330), so a radiation image cannot be obtained until the initialization operation is started again. This state can continue for, for example, about several seconds. If the threshold value is uniformly increased to reduce false detection caused by exogenous noise, weak radiation cannot be detected.

The present inventors have obtained the following finding regarding the evaluation value of the radiation dose and the N signal described above. More specifically, when the radiation imaging apparatus 110 is irradiated with radiation, the evaluation value changes in the positive direction or the negative direction with respect to the average value $\mu$ described above. The direction of change depends on the arrangement of the radiation imaging apparatus 110. In this embodiment, it is assumed that the evaluation value changes in the positive direction (that is, the evaluation value increases) by irradiation of radiation.

When exogenous noise is applied to the radiation imaging apparatus 110, the evaluation value changes in both the positive direction and the negative direction with respect to the average value $\mu$. The waveform in the positive direction and the waveform in the negative direction of the evaluation value to which exogenous noise is added are almost symmetrical. The above-described S signal and N signal change in opposite directions with respect to the average value $\mu$. That is, when the S signal changes in the positive direction, the N signal changes in the negative direction, and when the S signal changes in the positive direction, the N signal changes in the negative direction. Since the evaluation value is calculated by subtracting the N signal from the S signal, the evaluation value changes in the negative direction when the N signal changes in the positive direction, and the evaluation value changes in the positive direction when the N signal changes in the negative direction. Therefore, in this embodiment, the control unit 112 determines a threshold value based not on the evaluation value but on the N signal, and determines, based on comparison between the threshold value and the evaluation value, whether the pixel array 210 is being irradiated with radiation.

An example of the operation of determining the threshold value will be described with reference to FIG. 9. This operation is performed in step S320 of FIG. 3 in parallel with the operation (that is, determination as to whether radiation is being applied) illustrated in FIG. 5. In step S901, the control unit 112 acquires the N signal while waiting for the start of radiation irradiation. Since the control unit 112 acquires the N signal in step S501 of FIG. 5, this N signal may be used. Instead, the control unit 112 may separately acquire the N signal.

In step S902, the control unit 112 performs addition processing of the N signal. The control unit 112 may acquire (for example, sample) a plurality of N signals in one initialization operation. The control unit 112 sets a value obtained by adding or averaging some or all of the plurality of N signals as one N signal according to the one initialization operation. With this processing, the system noise included in the N signal can be reduced. If the addition processing is performed, one threshold value is determined based on the plurality of N signals acquired in one initialization operation. If the addition processing is not performed, that is, if one N signal is acquired in one initialization operation, the control unit 112 uses this N signal in subsequent processing.

In step S903, the control unit 112 performs frame correction on the N signal. As has been described above, the frame correction is processing for reducing switching noise using a plurality of detection signals (a plurality of N signals in this step) acquired in a plurality of initialization operations performed on one pixel row at different times. For example, the control unit 112 performs frame correction of the N signal in accordance with following equation (4).

$$N''[y]=N[y]-N[y-Y] \qquad (4)$$

In this equation, the frame correction is performed using the N signal (that is, N(y−Y)) of one frame before, but the frame correction may be performed on the current N signal using the N signal of another frame. For example, in order to perform the frame correction, the N signal of K frames before (K>1) may be used, or the average value of the N signal of K frames before and the N signal of (K+1) frames before may be used.

In step S904, the control unit 112 integrates the N signal (N''[y]). This makes it possible to pick up frequency noise according to the number of integrations and the switching frequency. Let T[m] be the integrated value of N''[y] (m is the identifier of the integration section).

In step S905, the control unit 112 determines the noise level of exogenous noise based on the integrated value T[m] of N''[y]. The integrated value T[m] at time t is represented by T[m](t), and the noise level at time t is represented by T''[m](t). In this case, the control unit 112 determines the noise level in accordance with the following equation (5).

$$T''[m](t)=|\alpha[m]*T[m](t)|(\text{for } T[m](t)<0),=0(\text{for } T[m](t)\geq 0) \qquad (5)$$

where α[m] is a coefficient set in advance in accordance with the signal processing form of the radiation signal.

In step S906, the control unit 112 determines, based on the noise level T"[m](t), a threshold value TH"[m](t) used in step S503. The control unit 112 may determine the threshold value TH"[m](t) by changing the standard threshold value (for example, the threshold value used in FIGS. 7 and 8) based on the noise level T"[m](t). For example, let TH[m] be the standard threshold value. In this case, the control unit 112 determines the threshold value TH"[m](t) in accordance with the following equation (6). In this operation, the control unit 112 functions as a threshold value determination unit.

$$TH"[m](t)=TH[m](t)+T"[m](t) \qquad (6)$$

This threshold value TH"[m](t) is based on the N signal but not on the evaluation value.

In order to set the threshold value at time t+Δt to the standard threshold value when radiation is applied, the control unit 112 may subtract a constant value from TH[m](t), or may divide TH[m](t) by a constant value. Further, the control unit 112 may compare the subtracted or divided value with the newly calculated threshold value, or may set the threshold value to the standard value if T[m](t)>0. Furthermore, the control unit 112 may determine the threshold value TH"[m](t) by changing the standard threshold value TH[m](t) so as to have a time constant. Alternatively, the control unit 112 may determine the threshold value TH"[m](t) so as to fall within a predetermined range. For example, the control unit 112 may determine the threshold value TH"[m](t) so as not to fall below the standard threshold value and not to exceed three times the standard threshold value.

Figure 10:
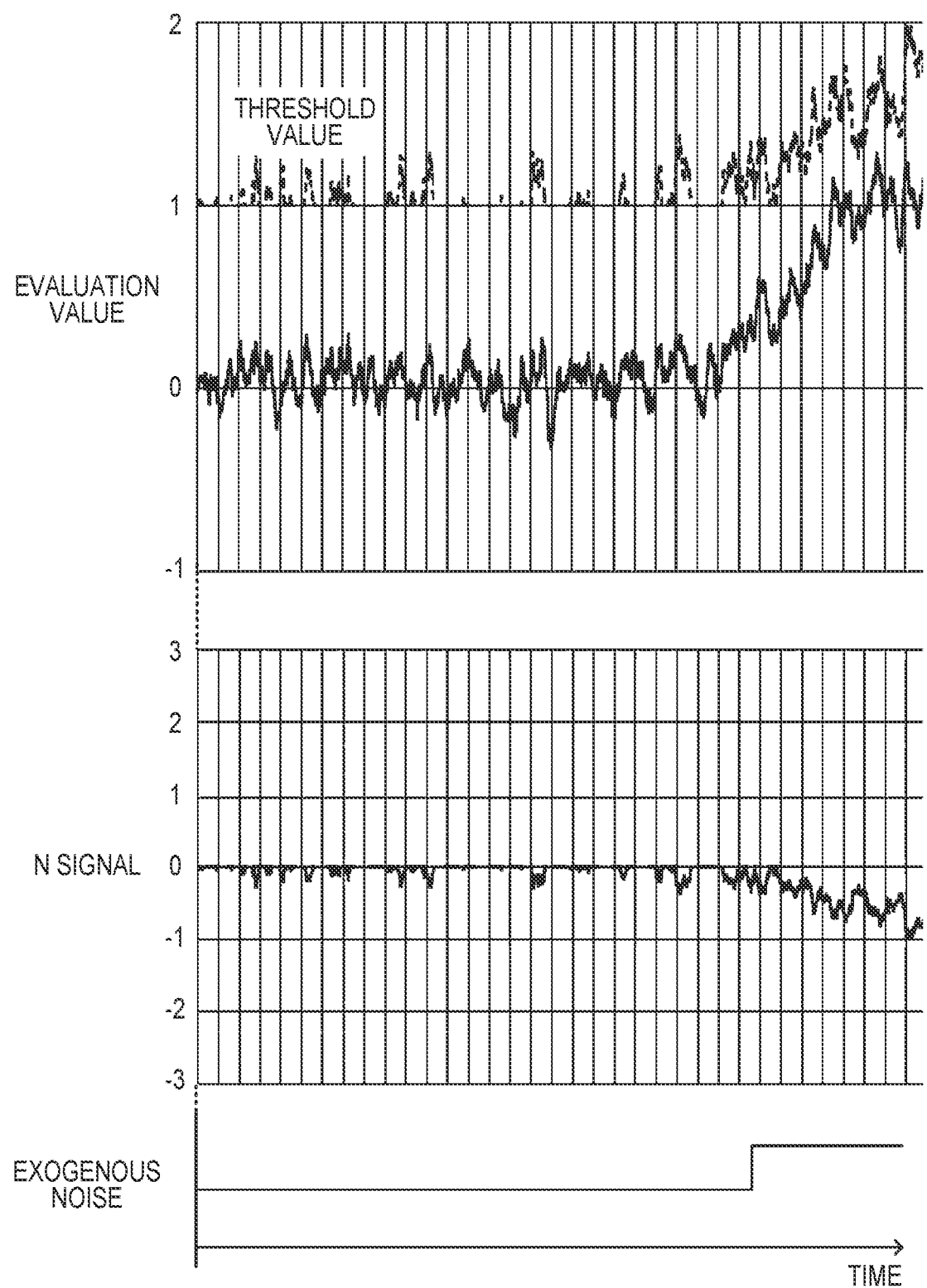
FIG. 10 shows graphs for explaining detection of radiation irradiation according to the embodiment of the present invention.
Figure 11:
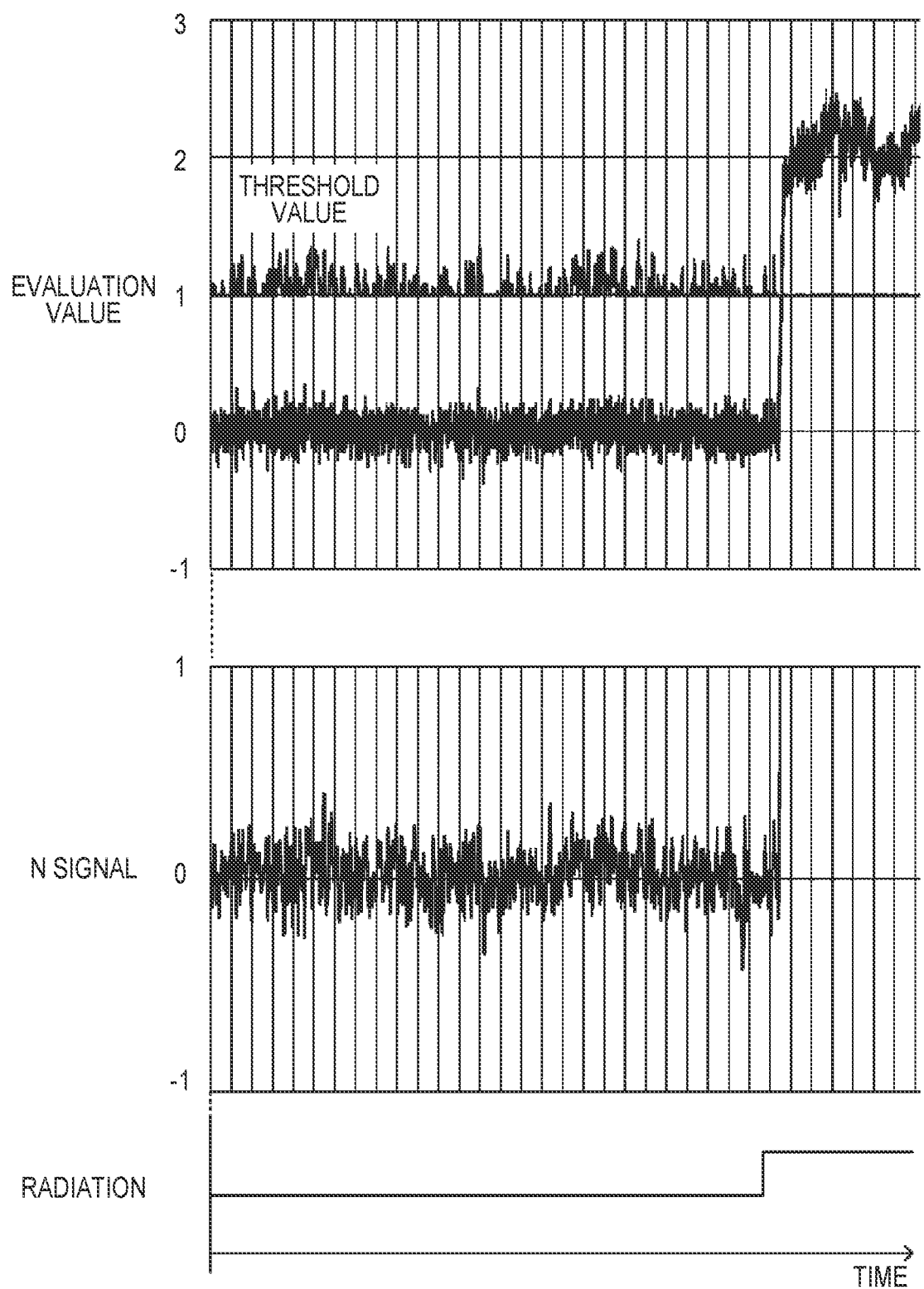
FIG. 11 shows graphs for explaining detection of radiation irradiation according to the embodiment of the present invention.

In this manner, by determining the threshold value based on the N signal and determining, based on comparison between the threshold value and the evaluation value, whether the radiation is being applied, it is possible to reduce false detection of radiation irradiation. The effect of this embodiment will be described below with reference to FIGS. 10 and 11. The operation in step S503 in a case in which the threshold value is determined based on the N signal will be described with reference to FIGS. 10 and 11. The upper graph in each of FIGS. 10 and 11 shows the fluctuation of the evaluation value of the radiation dose determined in step S502. In these graphs, the broken line indicates the threshold value. The middle graph in each of FIGS. 10 and 11 shows the fluctuation of the N signal acquired in step S901. The lower graph in FIG. 10 shows the fluctuation of exogenous noise. The lower graph in FIG. 11 shows the fluctuation of the irradiation amount of radiation. In the graphs in FIG. 10, it is assumed that no radiation irradiation is performed. In the graphs in FIG. 11, it is assumed that no exogenous noise is generated.

As shown in FIG. 10, when exogenous noise is generated, the N signal changes in the negative direction and the evaluation value changes in the positive direction. In accordance with the change of the N signal in the negative direction, the threshold value TH"[m](t) determined in step S906 changes in the positive direction. Therefore, the evaluation value does not exceed the threshold value TH"[m](t), so that the control unit 112 determines that radiation is not being applied. That is, false detection of radiation irradiation does not occur.

As shown in FIG. 11, when radiation is applied, the N signal changes in the positive direction and the evaluation value changes in the positive direction. When the N signal changes in the positive direction, the threshold value TH"[m](t) determined in step S906 is set to the standard threshold value. Therefore, the evaluation value exceeds the threshold value TH"[m](t), so that the control unit 112 determines that the radiation is being applied. That is, false detection of radiation irradiation does not occur.

Figure 12:
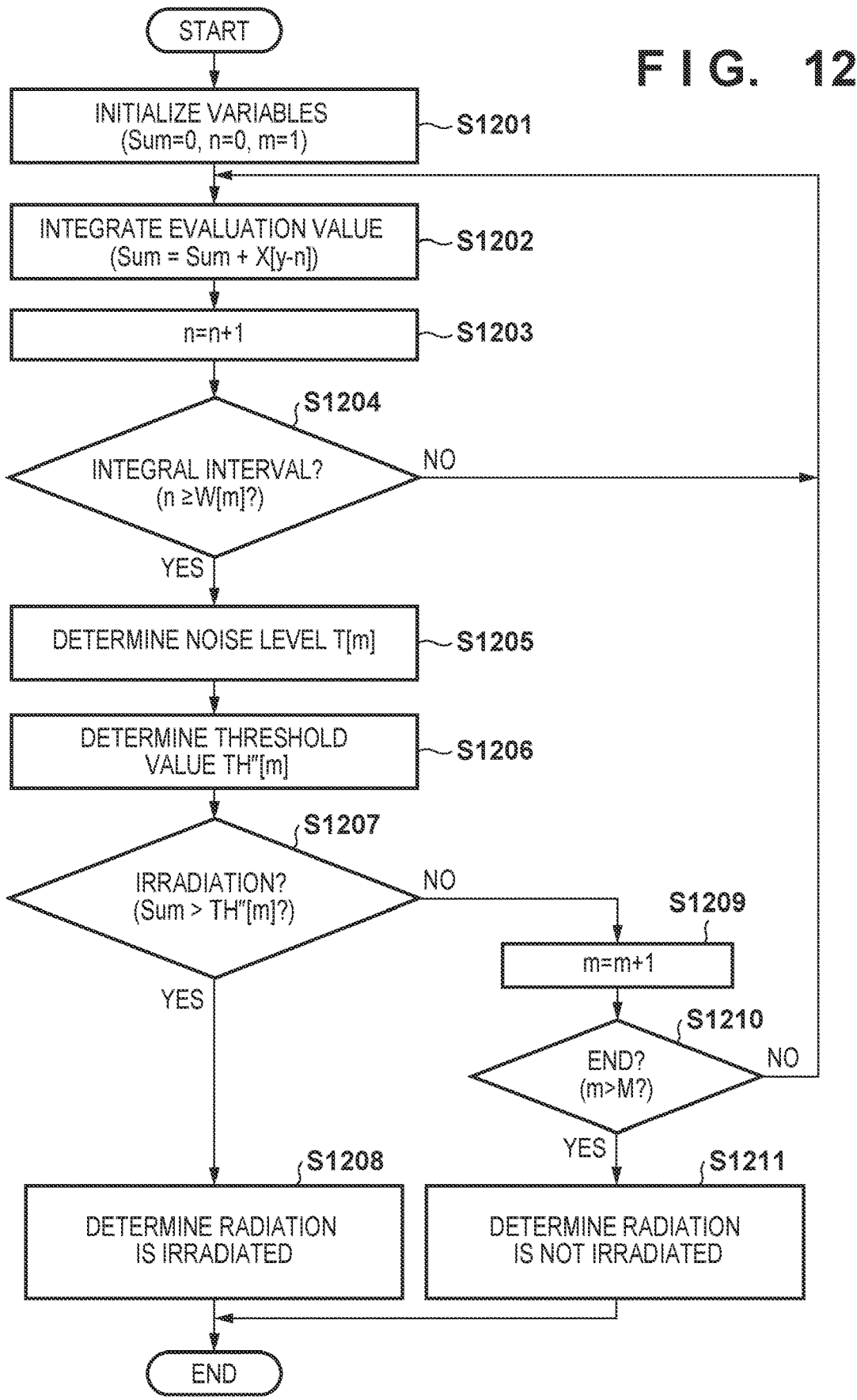
FIG. 12 is a flowchart for explaining another radiation detection operation according to the embodiment of the present invention.

Another example of step S302 will be described in detail with reference to FIG. 12. In this example, the control unit 112 integrates the evaluation value for each of a plurality of integration sections and compares the integrated value with a threshold value. If the integrated value exceeds the threshold value in any of the integration sections, the control unit 112 determines that the radiation is being applied. In FIG. 12, Sum represents an intermediate result of the integrated value, n represents a difference between the evaluation value which is currently obtained and the evaluation value which is to be added, and m represents the ordinal number of the integration section being processed. Further, M represents the number of integration sections to be processed, and W[m] represents the number of evaluation values to be included in the mth integration section.

In step S1201, the control unit 112 initializes variables Sum, n, and m to 0, 0, and 1, respectively. This processing is referred to as reset of the integrator. In step S1202, the control unit 112 integrates the evaluation value. More specifically, the control unit 112 adds X[y−n] to the current Sum. In step S1203, the control unit 112 increments n by 1.

In step S1204, the control unit 112 determines whether the current integration result includes the number of evaluation values to be included in the mth integration section. If the evaluation values having this number are included (YES in step S1204), the control unit 112 advances the process to step S1205; otherwise (NO in step S1204), the process advances to step S1202.

Figure 9:
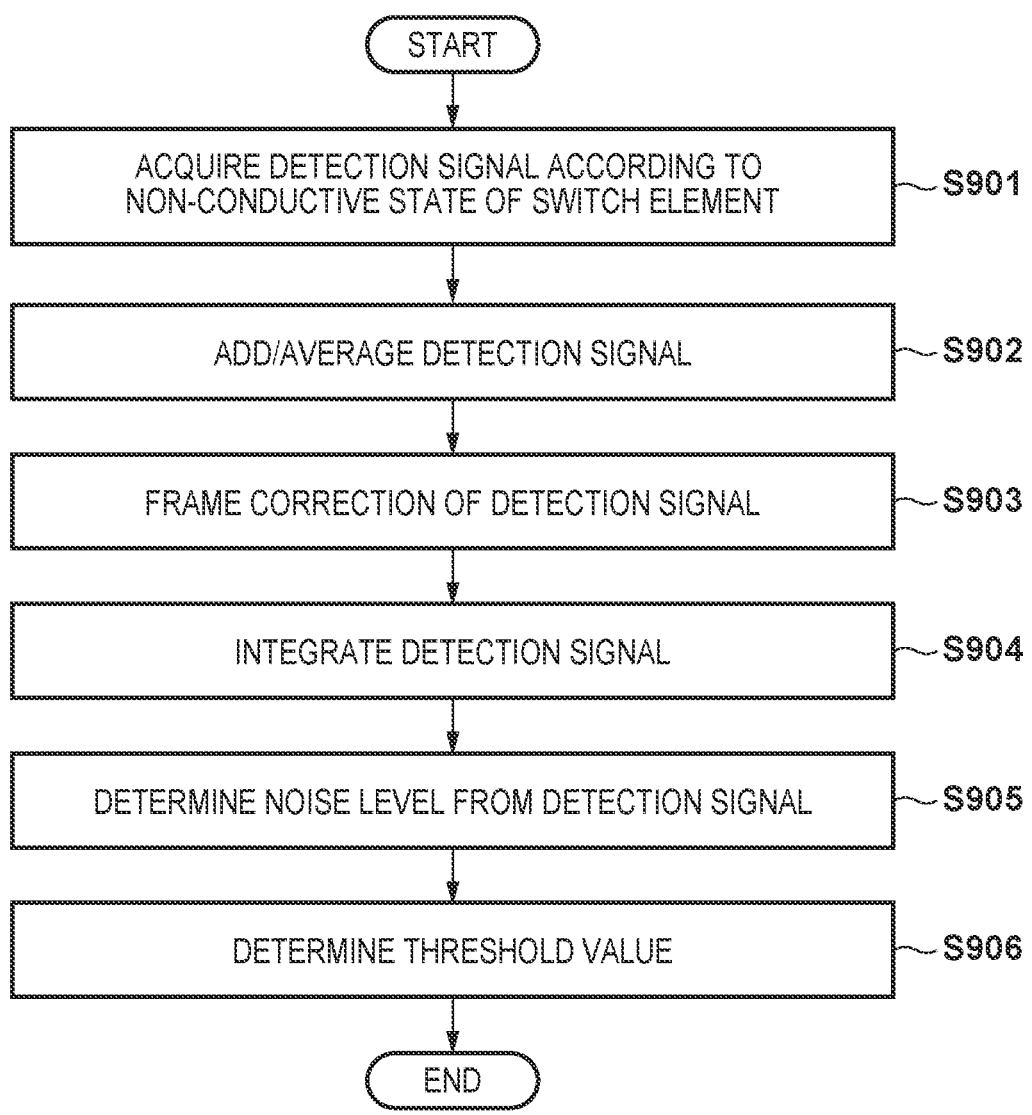
FIG. 9 is a flowchart for explaining a threshold value determination operation according to the embodiment of the present invention.

In steps S1205 and S1206, the control unit 112 determines the noise level T" [m] and the threshold value TH"[m] by performing processing similar to that illustrated in FIG. 9. α[m] in the above-described equation (5) may be set for each integration section, or may be a constant value.

In step S1207, based on comparison between the integrated value Sum of the evaluation value and the threshold value TH"[m], the control unit 112 determines whether radiation is being applied. More specifically, if Sum>TH" [m] holds (YES in step S1207), the control unit 112 advances the process to step S1208 and determines that radiation is being applied. Otherwise, the control unit 112 advances the process to step S1209.

In step S1209, the control unit 112 increments m by 1. In step S1210, the control unit 112 determines whether to terminate the determination processing. More specifically, the control unit 112 determines whether m is larger than the number of integration sections to be processed. If the determination processing should be terminated, the control unit 112 advances the process to step S1211, and determines that radiation is not being applied. Otherwise, the control unit 112 returns the process to step S1202.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-157269, filed Aug. 29, 2019, which is hereby incorporated by reference herein in its entirety.

What is claimed is:

1. A radiation detection apparatus, comprising:
    a pixel array including a plurality of pixels, each of the plurality of pixels including a conversion element and a switch element;
    an acquisition unit configured to acquire a first signal generated in the pixel array while at least one of the switch elements of the plurality of pixels is in a conductive state, and configured to acquire a second signal generated in the pixel array while the switch elements of the plurality of pixels are in a non-conductive state;
    an evaluation value determination unit configured to determine, based on the first signal, an evaluation value having a correlation with a radiation dose;
    a threshold value determination unit configured to determine a threshold value based on the second signal and not the evaluation value; and
    a determination unit configured to determine whether the pixel array is being irradiated with radiation based on comparison between the evaluation value and the threshold value.

2. The apparatus according to claim 1, wherein the plurality of pixels are arranged so as to form a plurality of pixel rows and a plurality of pixel columns; and
    the apparatus comprises a drive circuit configured to repeatedly perform an initialization operation of setting the switch elements in at least one of the pixel rows in the conductive state and then setting the switch elements of the plurality of pixels in the non-conductive state.

3. The apparatus according to claim 2, wherein the acquisition unit acquires a plurality of the second signals in one initialization operation performed on one pixel row; and
    the threshold value determination unit determines one threshold value based on the plurality of the second signals.

4. The apparatus according to claim 2, wherein the threshold value determination unit determines one threshold value based on a plurality of the second signals acquired in a plurality of the initialization operations performed at different times on one pixel row.

5. The apparatus according to claim 1, wherein the threshold value determination unit determines the threshold value based on an integrated value of the second signal.

6. The apparatus according to claim 1, wherein the threshold value determination unit determines the threshold value by changing a predetermined value based on the second signal.

7. The apparatus according to claim 6, wherein the threshold value determination unit changes the predetermined value so as to have a time constant.

8. The apparatus according to claim 1, wherein the threshold value determination unit determines the threshold value so as to fall within a predetermined range.

9. The apparatus according to claim 1, wherein the pixel array further includes a bias line configured to supply a bias potential to each of the conversion elements, and
    each of the first signal and the second signal is based on a current flowing through the bias line.

10. The apparatus according to claim 1, wherein the determination unit repeatedly determines whether radiation is being applied while waiting for irradiation of radiation to the pixel array.

11. The apparatus according to claim 1, wherein the evaluation value determination unit determines the evaluation value further based on the second signal.

12. A radiation imaging system, comprising:
    the radiation detection apparatus according to claim 1; and
    a radiation source configured to emit radiation toward the radiation detection apparatus.

13. A method of controlling a radiation detection apparatus comprising a pixel array including a plurality of pixels, each of the plurality of pixels including a conversion element and a switch element, the method comprising the steps of:
    acquiring a first signal generated in the pixel array while at least one of the switch elements of the plurality of pixels is in a conductive state, and a second signal generated in the pixel array while the switch elements of the plurality of pixels are in a non-conductive state;
    determining, based on the first signal, an evaluation value having a correlation with a radiation dose;
    determining a threshold value based on the second signal and not the evaluation value; and
    determining whether the pixel array is being irradiated with radiation based on comparison between the evaluation value and the threshold value.

14. A radiation detection apparatus, comprising:
    a radiation detection panel including a pixel array including a plurality of pixels, each of the plurality of pixels including a conversion element and a switch element; and
    a control unit configured to control the radiation detection by the steps of:
    acquiring a first signal generated in the pixel array while at least one of the switch elements of the plurality of pixels is in a conductive state, and a second signal generated in the pixel array while the switch elements of the plurality of pixels are in a non-conductive state,
    determining, based on the first signal, an evaluation value having a correlation with a radiation dose,
    determining a threshold value based on the second signal and not the evaluation value, and determining whether the pixel array is being irradiated with radiation based on comparison between the evaluation value and the threshold value.

* * * * *